US005680535A

United States Patent [19]

Harbin et al.

[11] Patent Number: 5,680,535

[45] Date of Patent: Oct. 21, 1997

[54] SCREEN SAVER FOR EXHIBITING ARTISTS AND ARTWORDS

[75] Inventors: Lawrence Harbin, Washington, D.C.; Gary D. Galloway, Fairfax, Va.

[73] Assignee: Galerie 500, Washington, D.C.

[21] Appl. No.: 468,642

[22] Filed: Jun. 6, 1995

[51] Int. Cl.[6] .......... G06F 15/00

[52] U.S. Cl. .......... 395/173

[58] Field of Search .......... 395/153, 155, 395/161; 345/113, 114, 117, 118

[56] References Cited

U.S. PATENT DOCUMENTS 4,722,005 1/1988 Ledenbach .......... 358/168
5,568,599 10/1996 Yoshino et al. .......... 395/135

OTHER PUBLICATIONS

Microsoft Scene Quick Ref. Card—pp. 1–9 1995.
Art Screens Screen Saver Catelog Sheet—pp. 1–2, 1993.

*Primary Examiner*—Phu K. Nguyen
*Attorney, Agent, or Firm*—Farkas & Manelli

[57] ABSTRACT

An educational and stress-relieving screen saver for exhibiting artists and their artworks on a computer monitor. The screen saver includes a plurality of compressed artist introductory files and image files of the works of art of the artists. Files are segmented or identified according to artist groups wherein different groups may be selected or deselected for display, or added or deleted from the screen saver. During operation, routines are called for decompressing files and displaying artist's likeness and their works according to groups. A transition module is provided which includes a plurality of different effects which are called in a random or pseudo-random fashion to provide a variety of soothing and stress-relieving image transitions. Means are also provided for adjusting the time of display of image files and for providing on-demand display of detailed biographic information about each artist exhibited in the screen saver.

20 Claims, 3 Drawing Sheets

Microfiche Appendix Included
(2 Microfiche, 82 Pages)

SCREEN SAVER FOR EXHIBITING ARTISTS AND ARTWORDS

MICROFICHE APPENDIX

A microfiche appendix comprising one microfiche film having forty-one frames that discloses a program listing is submitted with and forms part of this document.

FIELD OF INVENTION

This invention is related to computer screen savers, but more specifically, to a computer screen saver that exhibits both artists and their artworks on a color monitor in an educational and stress-relieving manner through an arrangement of random transitions, data files and data structures in which respective artist's presentation groups include a likeness of or biographic information about the artist coupled with or followed by a presentation of respective images of artworks associated with that artist.

BACKGROUND OF THE INVENTION

The ultimate use of a computer screen when not in productive use is the display of art. This can be accomplished by a screen saver. A screen saver is a computer program which typically is resident in memory but visually dormant, and becomes operative to display images on a computer monitor upon occurrence of an event. A typical event for activation is the passage of a certain amount of time (usually a few minutes) of inactivity, e.g., a lapse in keyboard or mouse activity.

Screen saver systems are designed to prevent image burn-in in computer monitors. They can be implemented in hardware, software or a combination of both. Burn-in causes a permanent "shadow" of an image to become "fixed" in the phosphors or pixel elements on the inner face of the monitor's screen. This shadow interferes with the display quality of other images and may also be seen as a background image when the monitor is completely powered down. If an image is burned-in too badly, the monitor must be discarded. An image will burn-in when the "same" image or text resides on the screen for an extended period of time, e.g., weeks or months—which is typical in normal office environments. By periodically changing images displayed on the monitor, or by moving an image randomly over the face of the monitor, the likelihood of burn-in is minimized thereby avoiding such permanent shadows.

However, screen savers can have other uses. That is, a screen saver may be used as an educational tool and it can also provide a means for relieving stress through entertaining, soothing and stress-relieving image transitions coupled with the ordering of exhibited images. Such stress-relieving attributes may have significant therapeutic value in a problematic office environment.

Present-day solutions for preventing image burn-in include powering down the monitor (i.e., placing it in stand-by mode such as disclosed in U.S. Pat. No. 5,335,168 issued to Walker on Aug. 2, 1994), dimming the displayed image (U.S. Pat. No. 4,722,005 issued to Ledenbach on Jan. 26, 1988), sequentially changing the displayed image periodically, or moving a fixed or varying image across the face of the monitor (such as accomplished by commercially available screen saver of Berkeley Systems, Inc. of Berkeley, Calif.). Powering down the monitor has the disadvantage of falsely portraying a power-off state of the entire computer system which often prompts the user to mistakenly toggle the computer's power switch to an "off" position thereby resulting in the loss of active working data.

Periodic transitioning between a series of impressionist art images is also known, such as that accomplished by a commercial screen saver published by Microsoft (e.g., Microsoft Scenes). But this screen saver is not adapted to jointly exhibit both the artist and the works of such artists. Like many others, it only exhibits works of art seriatim, and provides not specific presentation of artists in an educational manner. In addition, transition effects of prior screen savers are limited to half a dozen or so and when observed over a long period, these transition effects become anticipatory and somewhat monotonous. Such a system does not facilitate learning by association of artists' likenesses and/or backgrounds and their respective works within a presentation group.

In addition, other commercial screen savers utilize animated images—either geometric or life—like figurines that "swim" randomly across the monitor. Most have little, if any, educational value. What's more, most developers of screen savers guard carefully their software to prevent its public disclosure. Finally, many screen savers are more disruptive of achieving the desired employment duties than complementary to achievement in the work place. Thus, many companies will order their removal from work-place computers.

For the most part, commercial screen savers are generally designed to appeal to the user's affinity to be entertained as opposed to contributing to building a knowledge base or relieving stress.

Thus, it is an objective of the present invention to provide a screen saver which avoids these foregoing drawbacks.

It is a primary objective herein to provide a screen saver having educational and therapeutic value for use in the work place and the office environment.

It is another objective of the present invention to provide a screen saver which exhibits a plurality of artists by artist groupings, wherein each group includes a likeness of the artist, a brief biographic statement regarding the artist, and a plurality of works by the artist thereby to facilitate presentation and educational benefits.

It is yet a further objective of the present invention to provide a screen saver having a file structure which enables the user to select artist groupings to be exhibited.

Yet it is a further objective of the present invention to provide a file naming scheme or file structure which enables convenient updating by adding artist groupings according to the identity of the artist.

It is a further objective of the present invention to provide not only educational benefits, but also to provide soothing and therapeutic benefits to the observer by providing a minimum threshold number of transitions thereby providing truly random effects.

It is another objective of the present invention to provide a screen saver system having the capability of storing a multitude of visual image files without consuming a substantial amount of disk storage and which utilizes a file compression scheme which, upon decompression, provides a requisite image quality to meet artists' approval and user satisfaction.

These objectives, as well as other features, aspects and advantages of the invention, will be more fully appreciated upon review of the accompanying description taken in connection with the appended drawings.

SUMMARY OF THE INVENTION

The invention comprises a method and an apparatus for providing an educational, entertaining and stress-relieving computer screen saver which exhibits the likeness of artists and their works in a specified sequence or manner, provides protection against image burn-in on a color computer monitor and provides soothing and stress-relieving image transition effects. Structurally, the invention includes an arrangement of files, program instructions and modules for effecting a sequence of operations to achieve the stated objectives. The screen saver includes at least one artist introductory file stored in compress format including the likeness of an artist and/or biographic information about the artist, at least one digitized and compressed image file associated with the introductory file and the artist, a set of program instructions for effecting the display of the introductory and image files after a predetermined lapse in user activity. In a preferred embodiment, the instructions decompress compressed image files, effect the display of a set of introductory files followed by the display of a corresponding set of image files, and provide random transitions at least between the image files thereby to facilitate education about the artist and his or her works, as well as, to provide protection against image burn-in and stress-relieving soothing visual effects.

In another aspect of the invention, a method is provided for exhibiting artists and their works in an educational environment and for visually relieving stress at a computer work station which includes a computer monitor, a plurality of files representing artists and works of art by said artists wherein said files are stored in compressed format in a storage medium. The method comprises the steps of providing a file decompression module for decompressing introductory and image files associated with at least one artist; providing an image transition module which includes a plurality of different transition effects for effecting visual transitions of files displayed on said computer monitor; sensing a triggering event to initiate rotating display of said artist's introductory and image files on said computer monitor; retrieving from said storage medium said artist introductory files; decompressing and displaying said retrieved artist introductory files; retrieving from said storage medium said artist image files representing works of art by said artist; decompressing said image file and displaying said decompressed image file on said computer monitor; repeating the retrieving, decompressing and displaying steps while calling said transition module to effect random transitions between successive displays of said image files until sensing the occurrence of a termination event; upon occurrence of termination event, ceasing the display of said introductory and image files, recording an identification of the artist or image last shown on said monitor and returning to a programming application last used at said computer work station; and resuming said rotating display of said artist introductory and image files upon a next sensing of said triggering event whereby beginning the display with said last shown image file or introductory file.

The invention, though, is pointed out with particularity by the appended claims.

DESCRIPTION OF ILLUSTRATIVE EMBODIMENTS

As used herein, a screen saver is one or more programs, files and/or related hardware/firmware elements which are activated passively (e.g., lapse of time) to display a visual representation of an image or file on all or a portion of a computer display device. An artist group (or grouping) means a set of files or memory elements associated with an individual artist and may include, for example, a data file of textual biographic information pertaining to an artist, a visual introductory file depicting the likeness of the individual artist which introductory file may also include some biographic information, and a set of image files which primarily show the works of art created by the individual artist. The set of image files may be a single file of the artist's work or a plurality of image files of the artist's works. A likeness of the artist and/or an artist's statement may be embedded within an image file. Likewise, a rendition of the artist's work may be embedded within an introductory file. Moreover, an artist grouping or plural groupings may be contained in a single file each of which is called or addressed by the screen saver program during program operation.

In essence, we contemplate that an artist's group or grouping within the context of the language of the appended claims may include any arrangement of data or image files which facilitates educational presentation and illustration of the artists and his or her associated works of art.

As used herein, the meaning of random includes random and pseudo-random. A file may comprise segmented portion of memory storage elements in a storage medium (e.g., a magnetic or optical disk) or a segment in memory (e.g., random access memory), or the like. A file also may comprise a portion or segment of another file. Computer or program instructions includes assembler, C++ (or version thereof), Pascal, Visual C, Visual Basic or other low or high-level language. A module or routine may be a set of instructions, a library routine or a file associated with an operating system. A program or set of instructions may be emulated in software, firmware or hardware. Compression generally means a reduction in the amount of storage over and above the storage requirements for bit-mapped images typically associated with visual images displayed on a computer monitor. Typical uncompressed image formats in the computer industry include .bmp and .tif files which have one-to-one mapping between 4-, 8-, 16- and 24-bit storage elements and pixels. A compressed image file is a file having fewer bits to represent a so-defined uncompressed image file.

Figure 1:
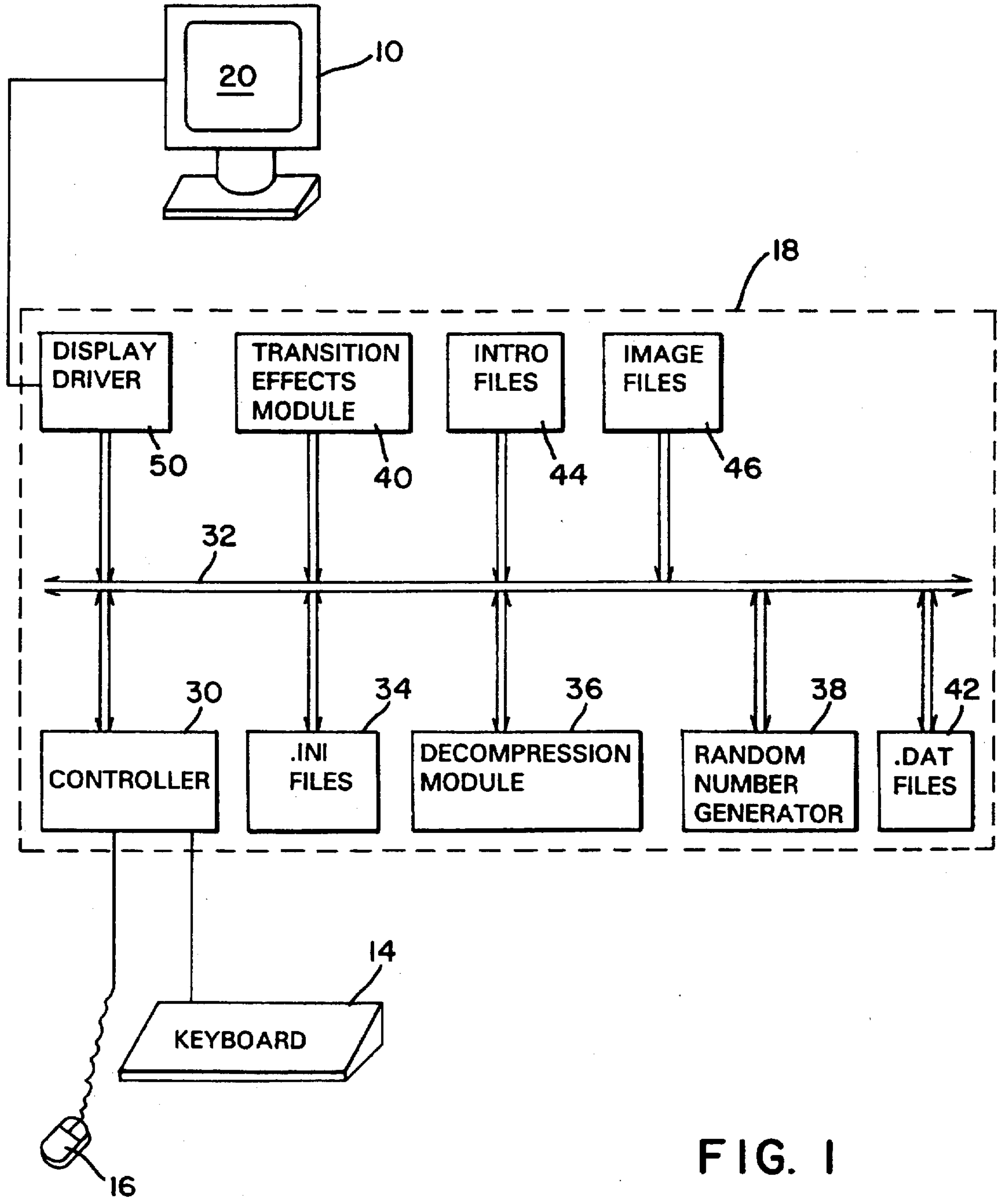
FIG. 1 is a functional block hardware diagram which illustrates a typical implementation of one embodiment of the claimed inventions.

With the foregoing understanding, FIG. 1 depicts a basic arrangement of a computing system which incorporate an illustrative embodiment of the present invention. The computing system includes a monitor 10, a keyboard 14, a mouse 16 and a set 18 of hardware and software elements typically included in a CPU case or on a motherboard in a desktop personal computer. The monitor 10 includes a screen 20 for which screen saving protection is provided in accordance with the present invention. As known in the art, the screen 20 is coated internally with a layer of luminating phosphor which is activated by a series of electron beams impinging upon an internal surface of the screen 20. Three electron beams associated with red, blue and green phosphorous elements create color images. Constant impingement by a fixed raster scan (i.e., fixed image), or uneven impingement at various portions of the internal surface of screen 20, is prone to cause image burn-in which the present invention is designed to prevent.

The set 18 of hardware and software elements of the computing system of FIG. 1 includes a controller or microprocessor 30, e.g., a CPU. Controller 30 is primarily responsible for handling the control functions of the entire computing system, including control of the screen saver. In the preferred embodiment, controller 18 comprises at least one Intel or Motorola chip (i.e., 80486/Pentium family or Motorola 68000 series processor), a ROM (read-only-memory) including a set of BIOS (Basic Input/Output System) instructions for handling communications with peripherals over a parallel bus 32, and other components. Parallel bus 32 may carry instructions, data and control information over sixteen, thirty-two or sixty-four bit paths. Connected with the bus 32 either physically or virtually are a series ofdevices and modules. By virtual connection, we mean conceptual modeling either in software or hardware where communication with controller 30 may occur directly over bus 32 or via other software modules, e.g., via the BIOS or via other higher level routines. In practice, modules or files 34, 42, 44 and 46 are stored on a hard drive in a computing system 18, driver 50 comprises an interface card (VGA card) with corresponding driver software loaded in the CPU's RAM memory, controller 30 is a CPU, and modules 36, 38 and 40 are memory resident instructions for assisting in carrying out performance of the screen saver. Other conventional elements (e.g., DMA controllers, I/O controllers, BIOS ROM, RAM memory, power supply, etc.) of the computing system 18 are excluded in the drawing for simplicity in illustration. These elements are well-known in the art.

Modules connected to bus 32 include .ini files 34 (initiation files) which store certain parameters for screen saver operation (i.e., DURATION and GROUPS (available artist's groupings)), a decompression module 36 which is called by controller 30 for decompressing compressed introductory and image files, a transition effects module 40 for storing a number of image transition effect routines, random number generator 38 for effecting random selection of one of a plurality of transition effects from the effects module 40, a .dat files module 42 for storing a textual data about the individual artists portrayed in the screen saver, an introductory files module 44 which stores image files pertaining to the identity and likeness of the artist, image files module 46 which stores representations of the works of art by the artists, and a display driver 50 which provides an interface between the digital environment of the computing system and the visual environment of monitor 10.

The .ini files module 34 may be an ASCII file which is updated with screen saver operating parameters during running of the screen saver. It is generally stored on a hard disk and records, under direction of the controller 30, the DURATION parameter during setup and keeps track of the LAST_ SHOWN group or image when the screen saver is interrupted by keyboard or mouse activity.

The decompression module, which is also stored as a library file on a hard disk and called by controller 30, may comprise one of several commercially available decompression modules. In the preferred embodiment, we utilize commercially available but proprietary decompression software provided by Lead Technologies of Charlotte, N.C. or fractal decompression software provided by Iterated Systems of Atlanta, Ga. We also considered JPEG compression (public standard), but found image quality to be slightly better using other schemes. Providing compressed file storage conserves disk space upon installation of the screen saver. Since the inventive screen saver includes between sixty and one hundred different images or screens, in uncompressed format, over fifty megabytes of storage in standard 640 by 480 pixel density in 24-bit true color depiction would be consumed. In compressed format, these files were reduced to about two megabytes.

The random number generator is software generated, as typically done in the art using standard library routines and typically comprises one or a set of instructions provided with the language of choice for writing the screen saver. As earlier explained, the inventive screen saver provides soothing therapeutic benefits for the observer in that the type of random transitions implemented between each visual presentation is not readily anticipated. To achieve this goal, it is required that a certain minimum number of transitions be provided. Unlike prior art screen savers, the commercially released version of present invention uses about fifty and can be provided with nearly one hundred different transitions. It is believed that the minimum number of transition effects to achieve truly random appearance to the observer is between thirty and fifty different transition effects. In some instances (because of the nature of the paintings portrayed or because of the observer's limited exposure to the screen saver), the threshold may be lower, but higher is certainly more advantageous to convey truly random or pseudo-random effects.

In the commercial version of the present invention, we implemented the screen saver in Visual Basic 3.0 provided by Microsoft. Our .dat files are ASCII files that are also stored on a hard disk. The .dat files contain data about the artist and further include nomenclature for assisting in setup of the displayed files (as disclosed in the appendix of program instructions).

Our transition effects module 40 was obtained from ImageFX of Rochester, N.Y. These effects are also stored on a hard disk as library routines. Our artist introductory files modules 44 and image file modules are LEAD Technology compressed image files which are decompressed with the aid of decompression module 36 upon display of files by the display driver 50. The display driver 50 may comprise any one of a several commercially available display drivers typically installed in computing systems. To date, we believe that there are more than fifty different commercially available display or graphics drivers or accelerators.

In operation, controller 30 which includes an operating system such as DOS/Windows, OS/2, Mac System 7+ or the like, controls or initiates the functions of all modules connected to bus 32. Controller 30 includes the program instructions for implementing the screen saver of the present invention as subsequently described more fully. The screen saver lies "dormant" in the system until an event, such as "silence" in keyboard 14 or mouse 16 activity for, say five or ten minutes.

Figure 2:
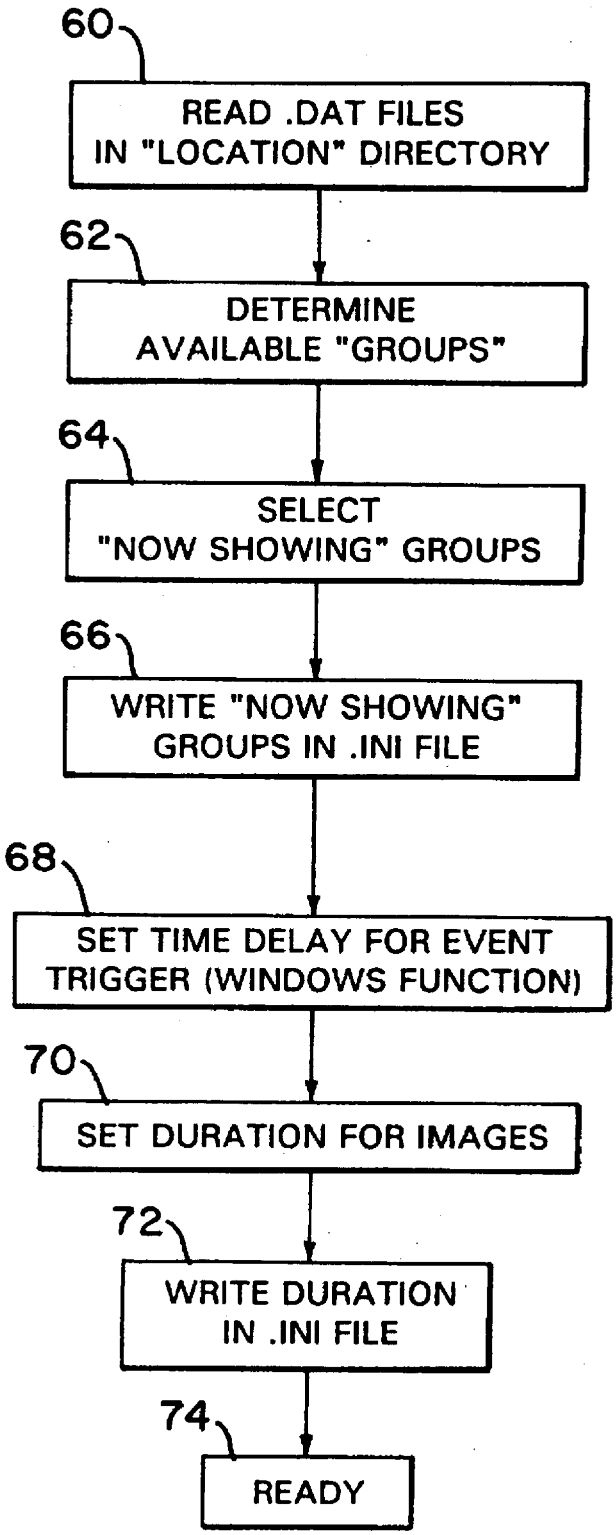
FIG. 2 illustrates a program flow of a setup routine for establishing operating parameters upon which the inventive screen saver may function when installed in a typical computing system.

Before proceeding to the actual operation of the screen saver, we believe that it will be helpful to describe, in connection with FIG. 2, a typical setup of the screen saver parameters.

The steps implemented during setup need not necessarily occur in the order presented herein. During setup of the screen saver parameters, an initial step 60 involves reading the .dat files contained in a "LOCATION" directory chosen by the user during installation. As apparent from the source code in the appendix, the name prefix of each .dat file establishes a link for grouping the associated artist introductory and image files.

In the implemented embodiment, a .dat file associated with artist Lois Jones, for example, is identified as lj0894.dat. This .dat file contains textual information about her background as well as her achievements in the arts. In accordance with an inventive file naming scheme of the present invention, her associated introductory files will bear the names lj08941.cmp, lj08942.cmp, etc. The .cmp file extension is akin to Lead Technology compressed files. These introductory files contain a representation of her likeness and a brief biographic statement. Image files of her paintings are designated by placing a "9" as the last introductory name digit. The file names in the image file sequence then become lj089491.cmp, lj089492.cmp, lj089493.cmp, and so on—from decimal to hexadecimal to alphabetic for a total of thirty-six images (assuming that a single digit image file naming scheme is employed).

In accordance with this exemplary file naming scheme, each artist has associated background, introductory and image files which are grouped or linked in a manner to facilitate exhibiting and presenting each artist in an educational format.

Upon reading the .dat files, a step 62 determines the available artist groups by reading the name prefixes and/or a first identifying data entry in the .dat files to determine a GROUPS parameter of available artist groupings. Specifically, the GROUPS parameter comprises the name prefixes of the .dat which are written in the .ini file as: GROUPS=lj0894,pg0894,jh0894,jw0894,jb0894,hg0894, bw0894 where lj0894 associates the biography, likeness and paintings of Lois Mailou Jones; pg0894 associates the biography, likeness and paintings of Paul Goodnight; jh0894 associates the biography, likeness and paintings of Joseph Holston; jw0894 associates the biography, likeness and paintings of James L. Wells; jb0894 associates the name, likeness and paintings of John Biggers; hg0894 associates the biography, likeness and paintings of Herbert Gentry; and bw0894 associates the biography, likeness and paintings of Billy Dee Williams.

This naming scheme not only facilitates artist groupings for convenient presentation and exhibition, but it also provides an advantageous way of upgrading the user's image library with additional artist groupings without modifying the executable setup or screen saver routine. By simply adding .dat, introductory and image files of additional artists, an appropriate GROUPS parameter is automatically generated during setup for use by the screen saver.

From a collection and display of data entries and parameters so obtained, the user selects via step 64 those artist groups identified by the GROUPS parameter which the user desires to be displayed during screen saver operation. Once selected, the setup routine writes a NOW_SHOWING parameter in the .ini file via step 66 as a representation of the identity of the artist groups to be displayed. Before or after writing the "NOW_SHOWING" parameter, a time delay event for triggering the screen saver is set in step 68.

In the preferred embodiment, time delay event for this step is performed in DESKTOP of the CONTROL PANEL in the conventional WINDOWS environment. It may also be implemented in the screen saver setup routine, or elsewhere in the operating system. At some point, the setup routine provides a step 70 for setting the DURATION of image display. In step 72, the DURATION and NOW_SHOWING groups are written in the .ini file before exiting setup at which point the screen saver is ready at step 74 for activation by Image_Main—the routine set forth in the appendix which runs in the background in a multitasking environment to monitor conditions for triggering screen saver activation. When initially installed, LAST_SHOWN=BEGINNING, or in other words, the first artist groups.

The foregoing steps, as well as other attributes of the invention, are detailed in the Visual Basic 3 source code listing contained in the microfiche appendix.

Figure 3:
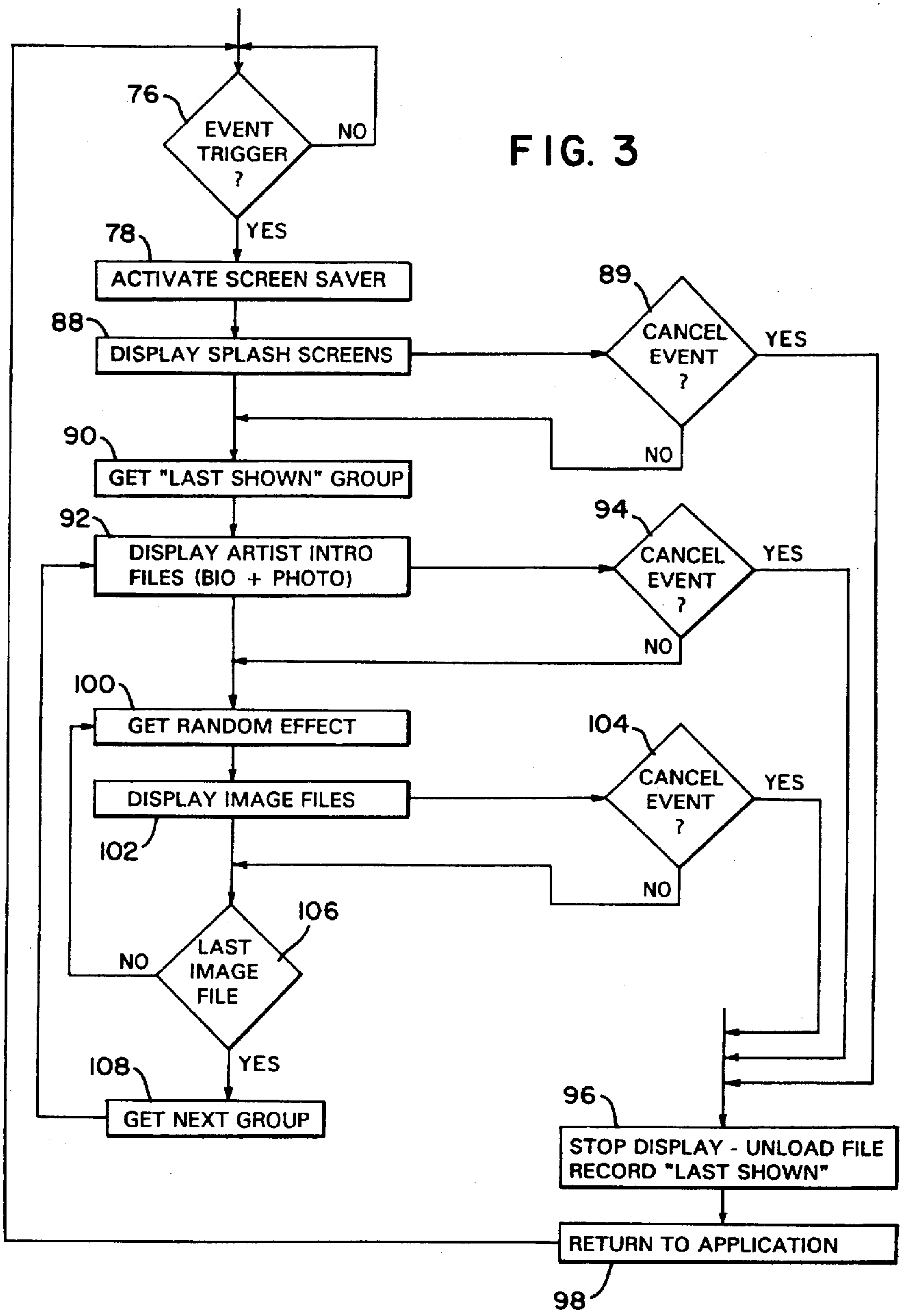
FIG. 3 is a generalized flow chart depicting the program flow of a screen saver practicing a general embodiment of one aspect of the claimed inventions.

FIG. 3 depicts a general operation of an illustrative embodiment of the inventive screen saver. It is not by any means as complete and thorough as the source code disclosed in the appendix. FIG. 3 is meant only to provide an understanding of the basic algorithms and program structure. This source code, written in Visual Basic 3.0, should be consulted in view of the WINDOWS 3.1+ operating system for detailed understanding of an illustrative embodiment of what is claimed herein.

Basically, the screen saver loops in its routine at 76 until the triggering of an event. Looping is performed in the background under control of controller 30 of FIG. 1. Triggering occurs after lapse of a fixed time period, e.g., five to ten minutes (this parameter is set by the user), from the last user activity through input devices such as a keyboard or mouse activity, as shown in FIG. 1. Upon activation, a screen saver active parameter is set at step 78 whereupon the screen saver routine initiates the display of SPLASH screens. In the preferred embodiment, SPLASH screens identify the manufacturer, publisher and/or sponsor of the artistic screen saver. Although fewer or more can be used, we use three SPLASH screens (or SPLASH files) in the commercial embodiment. The routine is written so that, if no SPLASH screens are found in the LOCATION directory, the SPLASH display is skipped and the routine proceeds to display the artist introductory files. However, if a CANCEL EVENT 89 (i.e., a screen saver termination event) occurs during display of the SPLASH screen, the screen saver is interrupted and the controller 30 (FIG. 1) returns to the application which was running just prior to screen saver activation.

Assuming that no CANCEL EVENT occurs, the screen saver routine obtains at step 90 the LAST_SHOWN artist group from the .ini file 34 (FIG. 1). If the screen saver is first ran after initial installation and setup, LAST_SHOWN= BEGINNING, as previously explained. Once the last shown artist group is identified, the screen saver routine begins to display or exhibit the artists introductory files at 92. If no introductory files are found, the screen saver skips to the display of the image files. Here again, the screen saver routine monitors keyboard/mouse activity for a CANCEL EVENT at 94 which, if affirmative, effects a branch of the routine to step 96. Step 96 stops the screen saver, records the LAST_SHOWN parameter in the .ini file, clears the monitor of the image files, and effects return to the user's application at 98.

It is noted that the process steps of FIG. 3 show detection of CANCEL EVENT during display or illustration of graphic information. Such detection during other operations need not be made since they occur rather rapidly.

Once the artist introductory screens are displayed at step 92, and assuming no CANCEL EVENT condition was detected, the screen saver routine prepares to illustrate the artists works of art, e.g., the image files. It should be noted that, in the event introductory files of particular artist are absent from the LOCATION directory, this routine is bypassed and the program skips to the next artist grouping.

As earlier noted, one aspect of the invention involves providing a minimum threshold number of stress-relieving image transition effects. Not only are a series of conventional wipes, fades and dissolves provided, but a number of non-traditional transitions are included in the set of available transition in modules 40 (FIG. 1). The random number generator, used in conjunction with controller 30, randomly selects one of the available transitions from module 40 for each artist image to be displayed. This is performed at step 100. Once the transition is obtained, the screen saver routine at step 102 obtains and displays the next image in the artist's group. Again, the display can be interrupted at step 104 upon detection of a CANCEL EVENT condition. Via the loop beginning at step 106, the display of artist's images is continued until the last image in the group is reached. Once the last image is fetched and displayed, the display of the next artist group is initiated at step 108 whereupon the previous steps are repeated.

A detailed disclosure of the source code listing is contained in the microfiche appendix where other attributes of the invention and program operation are readily apparent.

In addition to varying the display content of files on the monitor to achieve screen saving effects (i.e., even "wear" or wider or even use of RBG pixels), the mapping of pixel locations of a displayed file can be shifted a slight degree upon successive displays of a file. Moreover, because some effects require more time to implement than others, thus affecting the apparent display time, the DURATION parameter may be modified in accordance with the type of transition utilized for each effect. For example, the DURATION parameter may be sua sponte shortened or lengthened under program control in accordance with the determination by random number generator 38 (FIG. 1) so that, to the observer, the DURATION appears constant. An exemplary routine for making such adjustment is disclosed in the source code listing contained in the microfiche appendix.

Thus, it is appreciated that the aforestated goals, advantages and objectives are achieved by the teachings herein. In particular, it is seen that, unlike the prior art, both the artists and their works are exhibited together in a way to facilitate art education. It is also appreciated that the file naming scheme provides a convenient way to group the artist files by associated biographic information, artist introductory screens and files showing the paintings or drawings (or photographs or other works of art) of the artist. File compression enables storage of a multitude of files without consuming a substantial amount of disk space. Preferred decompression routines enable rapid decompression with adequate image quality. A minimum threshold number of transition effects reduces monotony and facilitates the educational and therapeutic benefits of the invention.

From the foregoing teachings and with the knowledge of those skilled in the art, it is apparent that other modifications and adaptations of the invention will become apparent. For example, the method steps disclosed and claimed herein may be practiced in a variety of different orders. Files may take on a variety of different forms within the meaning of the claims. The artist introductory and image files may include a variety of information and still fall within the scope of the claimed invention. Thus, it is our intent to include within the scope of the claims not only the invention literally embraced by the language of the claims, but to include all such modifications and adaptations which may come to those skilled in the art.

What we claim to be secured by United States Letters Patent is:

1. An educational and entertaining computer screen saver which exhibits the likeness of artists and artists' works, which provides protection against image burn-in in color computer monitors, and which provides plural transition effects between display of said works, said screen saver comprising an arrangement of files and program instructions for effecting screen saving operations, said screen saver comprising:

(a) at least one introductory file including a likeness of an artist and/or biographic information about said artist, (b) a plurality of image files associated with said at least one introductory file which include respective digitized representations of plural works of art by said artist, and (c) a set of program instructions for effecting display of said introductory and image files after a predetermined lapse in user activity, said instructions effecting the display of an introductory file followed by the display of associated image files and for effecting plural transition effects at least between the display of said plural image files thereby facilitating learning about the works of said artist, providing protection against image burn-in and providing soothing visual transistion effects.

2. A computer screen saver as recited in claim 1 wherein said program instructions include a routine for repeatedly displaying said introductory and image files in a sequence from a beginning to an ending, a routine for effecting random transition effects between at least said image files, and a routine for, after interruption of said sequence by keyboard or mouse activity, effecting the resumption of the said sequence of display of said introductory and image files at a last shown introductory or image file upon subsequent activation of said screen saver.

3. A computer screen saver as recited in claim 2 further comprising a data file associated with each artist that contains textual information related to background information of said artist.

4. A computer screen saver as recited in claim 3 further comprising a file naming scheme which enables additional artist groups to be added to said screen saver wherein an artist group includes a textual file containing artist background information, at least one artist introductory file containing the likeness and/or brief biographic information about said artist, and plural image files containing respective visual works of art of said artist, said file naming scheme comprising a common file naming segment which associates the names of said textual, introductory and image files within a particular artist group.

5. A computer screen saver as recited in claim 3 further comprising a routine for selecting and de-selecting respective artist groups which are to be displayed during cycling of said introductory and image files.

6. A computer screen saver as recited in claim 3 further including a display time setting routine for setting the duration of display of said introductory and image files.

7. A computer screen saver as recited in claim 6 wherein said display time setting routine includes instructions for adjusting the display time of said introductory and/or said image files according to the type of transitions what are randomly utilized by said screen saver.

8. A computer screen saver as recited in claim 3 further comprising means for randomly shifting the position of display of said introductory and/or said image files on said computer monitor thereby to provide wider utilization of pixel elements on said monitor during screen saver operation.

9. A computer screen saver as recited in claim 3 wherein said introductory and image files are stored in a storage medium in compressed format and upon display, said program instructions effect decompression of said introductory and image files.

10. An educational and stress-relieving computer screen saver for exhibiting artists and artists' artworks on a computer monitor in a computing system that includes a user input device, wherein the screen saver is activated upon occurrence of a first event and becoming deactivated upon occurrence of a second event, said screen saver comprising:

(a) a plurality of artist introductory and image files stored in compressed format in a storage medium, (b) an image transition module comprising a plurality of transition effects adapted to be called for effecting transitions between introductory and image files displayed on said monitor, (c) a decompression module including a set of instructions for retrieving said compressed introductory or image file from said storage medium, (d) a first set of instructions for calling said decompression module to retrieve from said storage medium and to display on said monitor a visual representation of at least one artist introductory file stored in compressed format wherein the visual representation includes a likeness or biographic information of said artist, said first set of instructions further including instructions for calling said transition module to effect transitions between display of each of said artist introductory files, and (e) a second set of instructions for calling said decompression module to retrieve from a storage medium and to display on said computer monitor a visual representation of a plurality of image files stored in compress format wherein the image files represents works of art of said artist, said second set of instructions including instructions for calling said transition module to effect random or pseudo-random transitions between the display of each of said image files.

11. An educational and stress-relieving computer screen saver as recited in claim 10 wherein said second set of instruction is separated from and nested within said first set of instructions.

12. An educational and stress-relieving computer screen saver as recited in claim 11 wherein the duration of display of said introductory files is different from the duration of display of said image files.

13. An educational and stress-relieving computer screen saver as recited in claim 10 wherein said first event is the lapse of a predetermined time period in which no user activity is detected and said second event is the detection of user input activity at said user input device.

14. An educational and stress-relieving computer screen saver as recited in claim 10 for exhibiting a plurality of artists and a plurality of works of each artist.

15. An educational and stress-relieving computer screen saver as recited in claim 10 wherein said at least on of said image files includes biographic information about an artists associated with said at least one of said image files.

16. A method for exhibiting artists and artists' works in an educational environment and for visually relieving stress at a computer work station which includes a computer monitor, a plurality of files representing artists and works of art by said artist wherein said files are stored in compressed format in a storage medium, said method comprising:

(a) providing a file decompression module for decompressing introductory and image files associated with at least one artist, (b) providing an image transition module which includes a plurality of different transition effects for effecting visual transitions of files displayed on said computer monitor, (c) sensing a triggering event to initiate rotating display of said artist introductory and image files on said computer monitor, (d) retrieving from said storage medium said artist introductory files, (e) decompressing and displaying said retrieved artist introductory files, (f) retrieving from said storage medium said artist image files representing works of art by said artists, (g) decompressing said image file and displaying said decompressed image file on said computer monitor, (h) repeating step (d) through (g) while calling said transition module to effect random transitions between successive display of said image files until sensing the occurrence of a second event, (i) upon occurrence of termination event, ceasing the display of said introductory and image files, recording an identification of the artist or image last shown on said monitor, and returning to a programming application last used at said computer work station, and (j) resuming said rotating display of said artist introductory and image files upon a next sensing of said triggering event beginning at said last shown image file.

17. The method as recited in claim 16 further including a step of selecting and deselecting individual display groups which include an artist and plural works of art of said artist to be retrieved and displayed on said computer monitor during steps (d) through (g).

18. The method as recited in claim 16 further including a step of selecting a duration of display of said image files on said computer monitor during steps (d) through (g).

19. The method as recited in claim 16 further including a step, prior to step (d), of providing a one-time display of a series of at least one splash screen associated with a sponsor of said artist.

20. The method as recited in claim 16 further comprising providing biographic textual information about said artist in a file stored in said storage medium, and providing a set of instructions for effecting the display of biographic textual data on demand.

* * * * *